United States Patent [19]

Nouvelot et al.

[11] Patent Number: 5,603,255
[45] Date of Patent: Feb. 18, 1997

[54] COOKING APPLIANCE OF THE GAS GRILL TYPE

[75] Inventors: David Nouvelot; Jean-Jacques Thibault, both of Lyons, France

[73] Assignee: Application Des Gaz, Paris, France

[21] Appl. No.: 556,454

[22] Filed: Nov. 15, 1995

[30] Foreign Application Priority Data

Nov. 18, 1994 [FR] France .................. 94 14051

[51] Int. Cl.⁶ .................................. A47J 37/00
[52] U.S. Cl. .................. 99/400; 99/389; 99/401; 99/446; 99/447; 99/450; 126/25 R; 126/41 R; 126/391
[58] Field of Search ............ 99/444–446, 400, 99/450, 401, 389, 447, 390, 339, 340; 126/391, 41 R, 39 R, 39 C

[56] References Cited

U.S. PATENT DOCUMENTS

| | | |
|---|---|---|
| 2,335,217 | 11/1943 | Tate .................. 99/390 |
| 2,441,190 | 5/1948 | Fuller ................ 99/390 X |
| 2,923,229 | 2/1960 | Halford ............... 99/390 X |
| 2,945,767 | 7/1960 | Phelan et al. . |
| 2,946,275 | 7/1960 | Compton .............. 99/390 |
| 3,091,170 | 5/1963 | Wilson ............... 99/427 X |
| 3,182,585 | 5/1965 | Rensch et al. ........ 99/400 X |
| 3,302,555 | 2/1967 | Burwell .............. 99/390 |
| 3,319,562 | 5/1967 | Turcott et al. ....... 99/390 X |
| 3,742,838 | 7/1973 | Luschen et al. ....... 99/389 |
| 3,757,765 | 9/1973 | Yamada . |
| 4,627,410 | 12/1986 | Jung ................. 126/41 R X |
| 5,158,066 | 10/1992 | Dodgen ............... 99/446 X |

FOREIGN PATENT DOCUMENTS

| | | |
|---|---|---|
| 0212750 | 3/1987 | European Pat. Off. . |
| 0443347 | 8/1991 | European Pat. Off. . |
| 2269311 | 2/1994 | United Kingdom . |
| 87/05197 | 9/1987 | WIPO . |

Primary Examiner—Timothy F. Simone
Attorney, Agent, or Firm—Oliff & Berridge

[57] ABSTRACT

A cooking appliance, such as a gas grill, includes a cooking pit, at least one radiant gas burner on a side wall of the pit, a receptacle for collecting liquid and cooking juices, and a bottom assembly which is heat-retaining and permeable with respect to the liquids flowing toward the collecting receptacle. The cooking appliance further includes a water spray assembly which allows steam cooking.

11 Claims, 1 Drawing Sheet

COOKING APPLIANCE OF THE GAS GRILL TYPE

BACKGROUND OF THE INVENTION

The present invention relates to a cooking appliance of the gas grill type.

DESCRIPTION OF THE PRIOR ART

In accordance with document US-C-2,945,767, a grill of professional or industrial type has already been described and proposed which comprises:

- a covered body delimiting a cooking pit, the latter constituting a substantially closed chamber,
- two radiant gas burners supported by the body on each side of the cooking pit, each one having a radiating surface emitting infrared radiation and permeable to the combustion smoke; each radiating surface is adjacent to the combustion pit and is oriented vertically or has a vertical component with respect to the overall direction of the cooking pit,
- a collecting receptacle, mounted on the body transversely in the lower opening of the cooking pit, and serving to collect cooking juices,
- a bottom, in the form of a gutter closing the cooking pit, and arranged removably in the latter, and situated both below the radiating surface of the two radiant burners and above the collecting receptacle; along the raised part of its surface this bottom simultaneously has a refractory nature with respect to the temperatures developed in operation by the radiant gas burner, properties of thermal separation or insulation of the collecting receptacles with respect to the radiating surface of the radiant burners, and relative permeability with respect to the liquids flowing toward the collecting receptacle, and with respect to vapors rising up from said receptacle.

By relative sealing of the cooking pit with respect to the outside, by the use of the collecting receptacle as a sealing means by virtue of the level of liquid therein, and by evacuating the combustion smoke at the upper part of the cooking pit through a calibrated orifice, it is possible according to this solution already proposed on the one hand to keep the inside of the cooking pit at a raised pressure with respect to the outside and, on the other hand, to obtain a relatively oxygen-lean atmosphere in this same pit during combustion, thus avoiding any combustion of the fats in contact with the piece of meat being cooked.

Moreover, still according to this same document, the piece of meat to be grilled is arranged vertically, inside and in the middle of the cooking pit, by means of an appropriate device which can be inserted into and extracted from said pit vertically, opening the latter to the outside in order to release the grilled piece of meat.

Within the context of a horizontal cooking appliance, having the appearance and all the functions of a "barbecue", the subject of the present invention is constructional features allowing, simultaneously, both good cooking efficiency and correct homogeneity of this cooking in the horizontal cooking plane, and to do so while maintaining cooking which is healthy, that is to say without flames or carcinogenic smoke, and flavorsome, that is to say mainly using relatively high temperature thermal radiation as the means of cooking.

SUMMARY OF THE INVENTION

In accordance with the present invention, a cooking appliance is disclosed having a cooking pit bounded by side walls an, upper opening occupied mainly by a transverse cooking grid and, a bottom assembly having an apparent surface which matches that of the cooking grid, and faces the cooking grid, without any substantial obstacle forming a barrier in the cooking pit between said bottom and said cooking grid.

By virtue of the constructional features defined before, it also becomes possible partly to evaporate the cooking juices present in the collecting receptacle or held back by the bottom, without destroying them by combustion, and to impregnate the piece of meat being cooked with these same evaporated juices, over practically its entire surface area, this adding to the flavorsome nature of the grilled piece thus obtained. Moreover, these same constructional provisions make it possible, without particular complication, to limit the temperature of the bottom, for example keeping it within a temperature range of between 100° and 400° C., and preferably between 100° and 250° C., this being to avoid any pyrolysis or combustion of the fats in the cooking pit, and to maintain cooking hygiene.

"Radiant gas burner" is understood to mean any burner emitting infrared radiation, whether this be a burner consisting of a refractory structure (metal grid or ceramic in plate form), brought to incandescence by combustion flames, or whether this be a catalytic induced-air burner, that is to say directly burning a fuel gas/oxidizing air mixture.

An appliance according to the invention further exhibits the following advantages:

- in the collecting receptacle it becomes possible to recover the juices or fats, which are not adversely affected by excessive heat or temperatures, this making it possible for them to be consumed at the same time as the food cooked on the cooking grid,
- by virtue of the refractory properties of the bottom assembly, it becomes possible to restore heat by radiation and convection toward the food to be cooked, in a proportion estimated for example at 15 to 25% of the total amount of heat generated by the radiant gas burner or burners,
- the bottom assembly and the collecting receptacle never reach temperatures likely to give rise to the formation of flames, for example by fat present in said receptacle catching alight.

BRIEF DESCRIPTION OF THE DRAWINGS

The present invention is now described with reference to the appended drawing, in which.

DESCRIPTION OF THE PREFERRED EMBODIMENT

Figure 1:
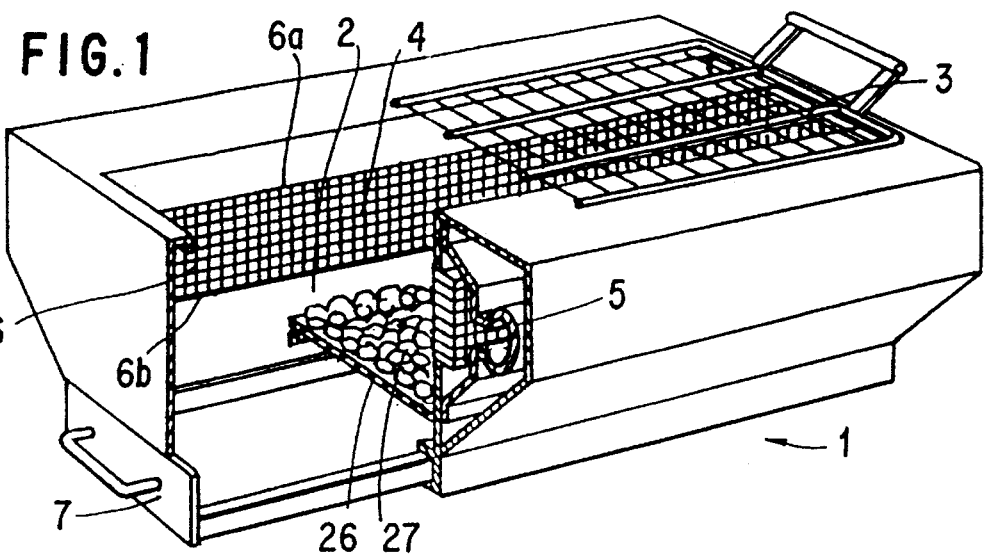
FIG. 1 represents a perspective view of a cooking appliance according to the invention with various partial cutaways.
Figure 2:
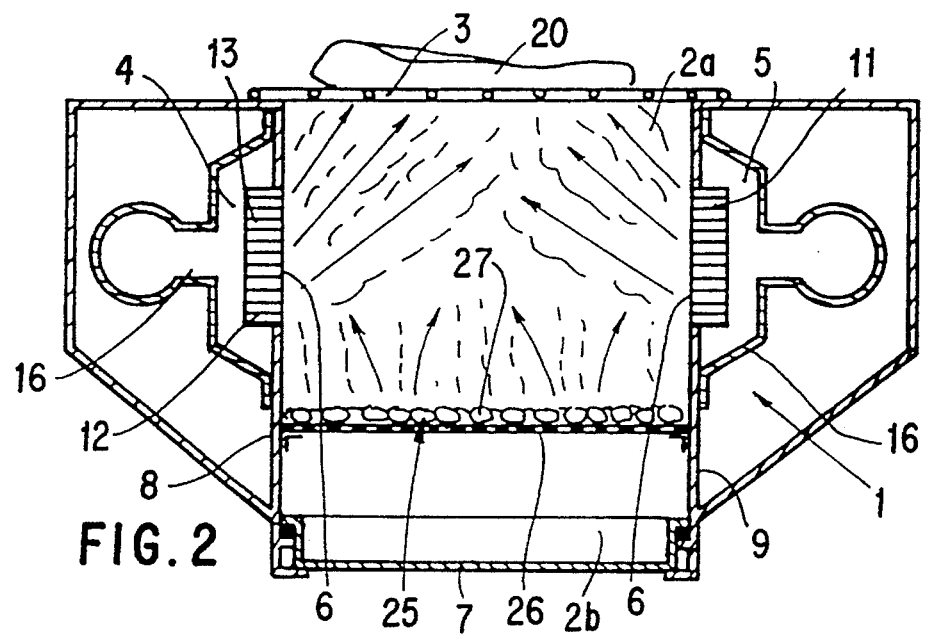
FIG. 2 represents a view in vertical and in transverse section of the cooking appliance represented in FIG. 1.

In accordance with FIGS. 1 and 2, a cooking appliance according to the invention, of gas grill type, comprises:

- a body 1, constituting the framework of the appliance, in the present case consisting of the assembly of various body elements which will not be described in further detail; this body is arranged so that it delimits or determines a cooking pit 2, having a rectangular transverse section widely open (2a) along its entire section at its upper part, and essentially delimited by two main and vertical walls 8 and 9 along its length, facing each other;

a transverse cooking grid 3 mainly occupying the upper opening 2a of the pit;

two identical gas burners 4 and 5 supported by the body, arranged on each of the two longitudinal sides of the cooking pit 2, each having a radiating surface 6 emitting infrared radiation and permeable to the combustion smoke; radiating surfaces 6 of the two burners 4 and 5 respectively are adjacent to the combustion pit 2, and shaped according to the corresponding internal surface thereof, in the present case in the form of a vertical surface, coplanar respectively with the vertical walls 8 and 9; as an option, the radiating surface 6 of the two gas burners 4 and 5 may be inclined slightly upward, that is to say toward the cooking grid 3.

A collecting receptacle 7, mounted on the body 1, transversely in the lower opening 2b of the pit 2;

a bottom assembly 25 closing the cooking pit 2 at its lower part, having simultaneously, along practically its entire surface area, a refractory nature with respect to the temperatures developed in operation by the radiant burners 4, 5, properties of thermal insulation of the collecting receptacle 7 with respect to the radiating surface of the burners 4, 5, and a relative permeability with respect to the liquids flowing toward the receptacle 7; this bottom assembly is situated below the radiating surfaces 6, facing the cooking grid 3, and above the collecting receptacle 7; the bottom assembly 25 comprises a support grid on which there rest discrete elements 27 made of a material of the pozzolan or lava stone type.

The result of the foregoing description is that the bottom assembly 25 has an apparent surface which matches that of the cooking grid, facing the latter, and without any apparent obstacle forming a barrier in the cooking pit 2 between the bottom assembly 25 and the transverse grid 3.

As FIG. 2 shows, each radiant gas burner 4 or 5 comprises a piece 12 in the form of a rectangular strip, the thickness of which is much smaller than its other dimensions, made of refractory ceramic, through which there pass a great many holes 13 for the passage of the fuel gas/oxidizing air mixture to be burnt, and the downstream face of which constitutes the radiating surface 6 described earlier. Each of the pieces 11 and 12 is fastened in a sealed manner into an appropriate opening formed in a vertical main wall 8 or 9. In register with the upstream face of each piece 12 is fixed a casing 16 making it possible to form a chamber for distributing the oxidizing air/fuel gas mixture to be burnt, arriving through a pipe which has not been represented, and doing so from a source of fuel gas which has also not been represented.

In accordance with FIG. 1, each radiating surface 6 is arranged in the cooking pit 2, between the cooking grid 3 and the bottom assembly 25.

As FIG. 2 shows, the body of the two burners 4 and 5 is arranged behind the two main and vertical walls 8 and 9 of the pit 2, respectively; and the two radiating surfaces 6 facing each other having a rectangular shape and therefore a transverse extension with respect to the height, belonging to the two burners 4 and 5 respectively, are arranged at the same level, one facing the other.

In operation, as represented in FIG. 2, the cooking grid receives infrared radiation from the two radiating surfaces 6, this radiation being represented by straight-line arrows. The combustion smoke, whose path is represented by irregular strokes, after having been ejected from the burner with a residual velocity, rises up slowly toward the cooking grid 3. Infrared radiation and convection heat are also restored residually by the bottom assembly 25 toward the cooking grid. The combination of this combustion smoke, of the convection, and of the infrared radiation makes it possible to obtain on the cooking grid a moderate temperature of the order of 250° to 300° C., with good distribution of the heat across the area, this contributing to the healthy and flavorsome cooking of the piece of food 20, for example a morsel of meat, to be grilled.

Figure 3:
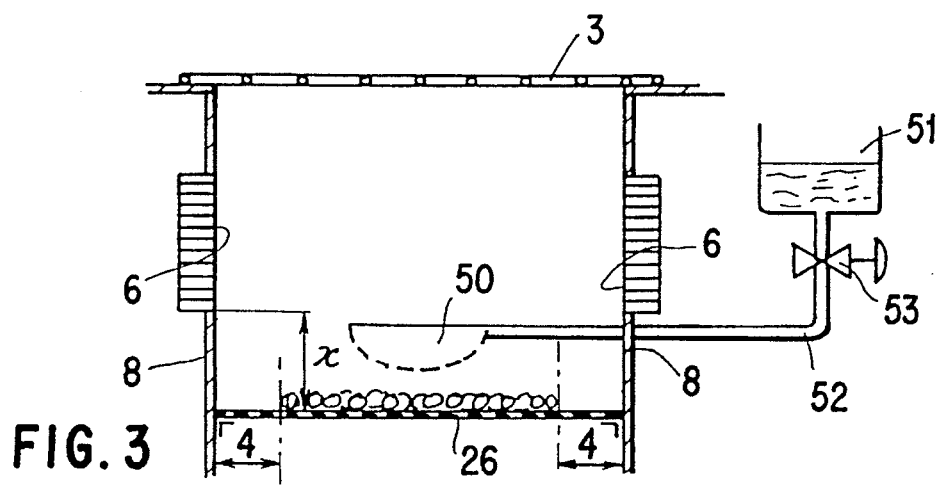
FIG. 3 diagrammatically represents the positioning of the bottom assembly in the cooking pit of an appliance in accordance with the invention.

In accordance with FIG. 3, in operation the temperature of the bottom, assembly and in the collecting receptacle 7, is preferably between 100° C. and 250° C., by arranging this bottom assembly 25 heightwise at a distance x from the lower edge 6b of the radiating surface 6 and/or at a distance y from the vertical plane passing through the radiating surface 6, x and y being selected appropriately, for example by routine trials.

It is appropriate to clean the bottom assembly 25 of the cooking pit periodically, so as to pyrolyze the fat deposited in and on the bottom assembly. In order to do this, two methods may be employed:

either covering the cooking appliance with a lid, and operating the appliance on maximum power of the radiant gas burners, or raising the bottom assembly 25 using any appropriate device, up to the burners 4 and 5 and operating these on full power.

This cleaning will be halted when no more smoke is given off.

In accordance with FIG. 3, a cooking appliance according to the invention may be provided with a means for sprinkling a spray of water above the bottom assembly 25, comprising a water receptacle 51 outside the body 1, a pipe 52 controlled by a tap 53 conveying the water from the receptacle to a water distributing device 50 situated above the bottom assembly 25 in the cooking pit 2.

Such an additional provision makes it possible to cook the piece 20 at least in part, or even fully, using steam, by vaporizing water in contact with the bottom assembly 25 then condensing the vaporized water rising up in the pit 2 in contact with and right within the piece 20 to be cooked. Cooking may thus be obtained which is both quicker and more succulent.

What is claimed is:

1. A cooking appliance comprising:

a cooking structure having at least one side wall surrounding a cooking pit, an upper periphery and a lower periphery;

at least one radiant gas burner within the at least one side wall of the cooking structure;

at least one radiating surface emitting infrared radiation and being permeable to combustion smoke, the at least one radiating surface being positioned substantially vertically between the at least one burner and the cooking pit;

a collecting receptacle removably mounted on the cooking structure along the lower periphery of the cooking structure;

a cooking grid removably positioned along the upper periphery of the cooking structure; and a bottom assembly located between the at least one radiating surface and the collecting receptacle, the bottom assembly and cooking grid being positioned within the cooking structure so as to allow unobstructed heat exchange therebetween.

2. The appliance as claimed in claim 1, wherein the bottom assembly comprising a fluid permeable, refractory material which accumulates heat and insulates the collecting receptacle from the at least one radiating surface.

3. The appliance as claimed in claim 1, wherein the bottom assembly comprises a support grid on which there rest discrete elements made of a refractory heat-retaining material.

4. The appliance as claimed in claim 1, wherein the bottom assembly is located at a distance from the radiating surface so that in operation a temperature of said bottom assembly lies between 100° and 400° C.

5. The appliance as claimed in claim 1, wherein the appliance further comprises a device for distributing water above the bottom assembly.

6. The appliance as claimed in claim 1, wherein the at least one radiating surface is inclined upward toward the cooking grid.

7. The appliance as claimed in claim 1, wherein the at least one radiating surface comprises a perforated refractory ceramic material.

8. The appliance as claimed in claim 1, where the appliance is a gas grill.

9. The appliance as claimed in claim 4, wherein the temperature of said bottom assembly lies between 100° and 250° C.

10. The appliance as claimed in claim 3, wherein the refractory heat-retaining material is selected from the group consisting of lava stone and pozzolan-containing materials.

11. The appliance as claimed in claim 4, wherein the temperature of the bottom assembly is controlled by adjusting at least one of two distance parameters, the two distance parameters being the distance from the bottom assembly to a lower edge of the radiating surface and the distance from the bottom assembly to a vertical plane passing through the radiating surface.

* * * * *